Feb. 14, 1933.   A. A. CRYER   1,897,753
STEAM TRAP
Filed May 21, 1931
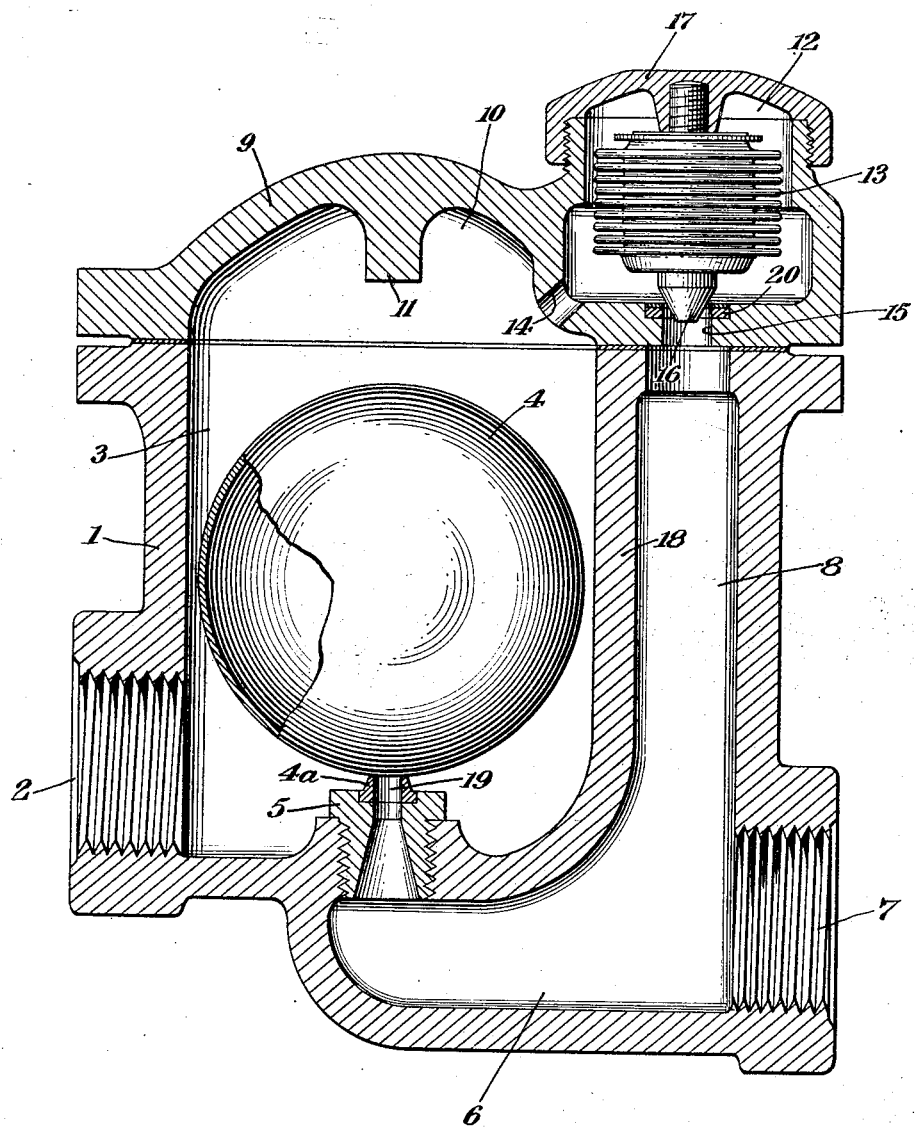
INVENTOR
Albert A. Cryer
BY
Kenyon & Kenyon
ATTORNEYS Patented Feb. 14, 1933

1,897,753

UNITED STATES PATENT OFFICE

ALBERT A. CRYER, OF NEW YORK, N. Y.; MATHILDE HELEN CRYER, OF NEW YORK, N. Y., EXECUTRIX OF SAID ALBERT A. CRYER, DECEASED

STEAM TRAP

Application filed May 21, 1931. Serial No. 538,975.

This invention relates to an improvement in discharge traps for use in connection with large steam-heating units in which there is a large accumulation of water of condensation and air and gas which it is important to discharge continuously from the system without allowing the escape of any substantial quantity of steam. In steam apparatus of this kind, it is important to cause the discharge of the water and of the air before they accumulate in any considerable quantity, as the efficiency of the apparatus is seriously interfered with unless this is done.

One object of the present invention is to cause the water of condensation to accumulate at the discharge end of the apparatus and to be discharged at frequent intervals from that point so that there will be no great accumulation of water at any time.

Another object of the invention is to cause the air or gas to accumulate in the upper part of the trap and to flow out from that position into a cooling chamber containing a thermostat where the air and gas are cooled and permitted to escape by the thermostat into a side passage connected with the discharge pipe. The cooling chamber is so arranged as to be cooled quickly and to cause quick operation of the thermostat so that the air and gas are discharged very shortly after entering the cooling chamber.

Another object is to control the water discharge port by an unattached floating ball serving as a valve and at the same time to cause the ball to operate as a piston when lifted by the water of condensation and to force the air and gas out of the body of the valve into the cooling chamber.

Another object of the invention is to prevent the escape of steam.

Another object of the invention is to so construct the parts that they are convenient in use, are easily accessible for replacement and repair, are economical in construction and are light in weight compared with the discharge capacity of the apparatus.

The invention is fully shown in the accompanying drawing, which is a vertical cross-section of a full-sized apparatus, the ball and thermostat being shown in side view.

Referring to the drawing, 1 is the body or casing of the trap which is made of a single casting of any suitable metal. 2 is the inlet opening of the trap which is provided, as shown, with a screw thread by means of which the trap can be screwed on to the discharge end of the heating unit or steam apparatus, whatever it may be. The steam apparatus is not shown in the drawing. The trap is adapted for use with any form of steam apparatus in which the steam is condensed in the operation of the apparatus so as to form water of condensation, as a result of which air and gas are liberated. As the particular form of steam heating or using apparatus is not material to the invention, it is not shown in the drawing. 3 is the main chamber of the trap in which the water of condensation collects. 4 is a ball which is adapted to rest upon the valve seat 4—a made of rustless steel. This valve seat is supported by a bronze bushing 5 which is screwed into the bottom of the casing as shown. In this way, the valve seat is lifted a little above the bottom of the chamber 3 in the body of the valve so that it will not be surrounded or clogged with dirt. The body of the casting is provided with an interior wall 18 which separates the chamber 3 of the casing from a side passage 8. The discharge port 19, passing through the valve seat 4—a, connects the chamber 3 with the discharge chamber 6 of the trap. The lower end of the side passage 8 connects with the discharge chamber 6. 7 is the discharge port of the trap. It is provided with the usual screw thread by means of which it can be connected with the discharge or outlet pipe for the escape of the water of condensation and the gas and the air.

9 is the top or cap of the trap. It is cast in a single piece. The cap is provided with a chamber 10 adapted to fit over and register with the chamber 3 of the main part of the valve casing. The cap 3 is also provided with a downwardly extending projection 11 which is adapted to limit the upward motion of the ball 4. 12 is a second chamber in the cap which is adapted to receive and hold the thermostat 13. This chamber is provided with a cap 17 having at its lower end a screw thread adapted to fit over and engage with a screw thread on the upper end of the cap 9 as shown. The thermostat 13 is preferably made in the form of a bellows as shown but any other suitable form of thermostat may be employed. The thermostat is connected with and supported from the cap 17 in any suitable way. In the form shown in the drawing, the thermostat has a screw-threaded plug at its upper end adapted to screw into a screw-threaded opening in the cap 17. The lower end of the thermostat is provided with a valve piece 16 which is adapted to close the opening into the upper end of the side passage 8. This opening is provided with a suitable valve seat 20 as shown.

The chamber 12 is a cooling chamber into which the air and gas may escape from the main chamber 3 and in which they are quickly cooled so as to cause the thermostat to be contracted as a result of which the valve 16 is opened and the air and gas are caused to escape into the side passage 8 and so through the discharge outlet or orifice 7. 14 is a passageway leading from the chamber 3 into the chamber 12. It is pointed directly towards the thermostat 13 so that, when the steam flows from the chamber 3 into the chamber 12, it will be caused to impinge directly upon the thermostat 13 and will thereby close the valve 16 very promptly.

The operation of the trap is as follows. When the steam apparatus or unit is first put into operation, air and gas flow into the trap and escape freely, through the passages 14, 15 and 8, into the chamber 6 and through the discharge opening or port 7 into the discharge pipe. This continues until the steam reaches the chamber 3 and begins to condense. When steam flows through the port 14 into the chamber 12, it will impinge upon the thermostat 13 and close the valve 16, thereby shutting off the escape of steam into the passage 8. When water of condensation has accumulated in sufficient quantity to lift the ball 4, the ball is lifted in the chamber 3, thereby opening the outlet passage 19 and water of condensation escapes until the ball has sunk sufficiently to again close the outlet 19. This accumulation and escape of water of condensation continues as long as the apparatus is in operation.

Air and gas will gradually accumulate in the upper part of the trap and will flow out through the passage 8 and discharge port 7 into the discharge pipe. Whenever there is an escape of water from the chamber 6 through the port 7, this water will tend to draw air and gas with it sucking it down the passage 8. When the accumulation of water of condensation lifts the ball 4 in the chamber 3, the ball will act as a piston and will tend to force air or gas out of the chamber 10 through the passages 14 and 15 into the passage 8 and from there into the chamber 6 and through the discharge port 7. This lifting of the ball 4 by the water of condensation and its operation as a piston tends gradually to expel the air and gas from the trap into the discharge pipe.

If at any time steam should escape past the ball 4 into the chamber 12, it will expand the thermostat and close valve 16 and so prevent the escape of any considerable quantity of steam.

This improved trap is suitable for use either in a pressure system in which the air and gas are forced into a return or discharge pipe in which atmospheric pressure or a pressure substantially at atmosphere is maintained or the trap may be employed in a vacuum system in which a pressure of atmosphere or even below atmosphere is maintained in the system and a suction or vacuum pump is connected with the return maintaining a vacuum at the return end.

In my preferred form of invention, the ball 4 is free or unattached so that it is free to move in the chamber 3. As a result, the ball is sensitive in its action and responds quickly to any increase in the accumulation of water of condensation. It also tends to revolve constantly so that the point of the surface of the ball which rests upon the seat is constantly changing. This makes the wear of the ball uniform and thereby increases its life.

The accumulation of any considerable body of water, air or gas is prevented, the water, air or gas being quickly discharged as soon as it tends to accumulate. The escape of steam in any considerable quantity is prevented.

The ball valve 4 and the valve seat 4a are made to conform to each other in shape, so as to fit each other accurately. The valve is round, and the valve seat is made with a narrow face which has a similar curve.

In practice, I prefer to use a ball valve that is made so as to have a submergence of about 50% in the water of condensation.

The apparatus is simple in construction and can be made very light in weight relatively to its discharge capacity. Another advantage is that the interior of the trap can be very easily reached so that the ball 4 can be easily removed or replaced and the trap cleaned. The thermostat can be easily reached by unscrewing the cap 17 and, if desired, the thermostat can be unscrewed from the cap and replaced with a new one.

I claim:—

1. A discharge trap adapted for use with steam heating or similar apparatus, consisting of a body portion and a cover, a main chamber in the body portion for the collection of the water of condensation, a discharge port leading from said chamber to the outlet, a valve to close said discharge port, a side passage in the body portion leading to the outlet, a cooling chamber inside of the cover adapted to register with the side passage, a port in the cover adapted to connect the main chamber with the cooling chamber, a port in the cover adapted to connect the cooling chamber with the side passage, and a thermostat in the cooling chamber adapted to close the port leading to the side passage, substantially as described.

2. A discharge trap adapted for use with steam heating or similar apparatus, consisting of a body portion and a cover, a main chamber in the body portion for the collection of the water of condensation, a discharge port leading from said chamber to the outlet, an unattached ball valve to close said discharge port, a side passage in the body portion leading to the outlet, a cooling chamber inside of the cover adapted to register with the side passage, a port in the cover adapted to connect the main chamber with the cooling chamber, a port in the cover adapted to connect the cooling chamber with the side passage, and a thermostat in the cooling chamber adapted to close the port leading to the side passage, substantially as described.

3. A discharge trap adapted for use with steam heating or similar apparatus, consisting of a body portion and a cover, a main chamber in the body portion for the collection of the water of condensation, a discharge port leading from said chamber to the outlet, an unattached ball valve to close said discharge port, a side passage in the body portion leading to the outlet, a cooling chamber inside of the cover adapted to register with the side passage, a port in the cover adapted to connect the main chamber with the cooling chamber, a port in the cover adapted to connect the cooling chamber with the side passage, a removable cap for the cooling chamber, a thermostat supported by the removable cap, and adapted to close the port leading to the side passage, substantially as described.

4. A discharge trap adapted for use with steam heating or similar apparatus, consisting of a body portion and a cover, a main chamber in the body portion for the collection of the water of condensation, a discharge port leading from said chamber to the outlet, an unattached ball valve to close said discharge port, a replaceable seat for said port consisting of a bushing provided with a central opening surrounded by a valve seat carried by the bushing, a side passage in the body portion leading to the outlet, a cooling chamber inside of the cover adapted to register with the side passage, a port in the cover adapted to connect the main chamber with the cooling chamber, a port in the cover adapted to connect the cooling chamber with the side passage, a removable cap for the cooling chamber, a thermostat supported by the removable cap, and adapted to close the port leading to the side passage, substantially as described.

In testimony whereof, I have signed my name to this specification.

ALBERT A. CRYER.